(12) United States Patent
Vas

(10) Patent No.: US 9,828,732 B2
(45) Date of Patent: Nov. 28, 2017

(54) DOG SCOOP SYSTEMS

(71) Applicant: Jim Vas, Chilliwack (CA)

(72) Inventor: Jim Vas, Chilliwack (CA)

( * ) Notice: Subject to any disclaimer, the term of this patent is extended or adjusted under 35 U.S.C. 154(b) by 55 days.

(21) Appl. No.: 14/991,996

(22) Filed: Jan. 10, 2016

(65) Prior Publication Data

US 2017/0198449 A1    Jul. 13, 2017

(51) Int. Cl.
*A01K 29/00* (2006.01)
*E01H 1/12* (2006.01)
*A01K 1/01* (2006.01)

(52) U.S. Cl.
CPC ............. *E01H 1/1206* (2013.01); *A01K 1/01* (2013.01); *E01H 2001/128* (2013.01); *E01H 2001/1226* (2013.01)

(58) Field of Classification Search
CPC .......... E01H 1/1206; E01H 2001/1226; E01H 2001/128; E01H 1/12; A01K 1/01
USPC ............ 294/1.3, 1.4, 1.5, 176, 179; 209/418
See application file for complete search history.

(56) References Cited

U.S. PATENT DOCUMENTS

| | | | | |
|---|---|---|---|---|
| 4,138,153 A * | 2/1979 | Brown | ................. | E01H 1/1206 15/257.1 |
| 4,198,720 A * | 4/1980 | Matsumoto | ........... | E04H 4/1609 15/1.7 |
| 4,447,082 A * | 5/1984 | Lindholm | ............. | E01H 1/1206 294/1.4 |
| 5,575,315 A * | 11/1996 | Wengert | .................. | B65B 67/04 141/10 |
| 5,580,111 A * | 12/1996 | Bohn | ................... | A01K 1/0114 294/1.3 |
| 6,612,379 B1 * | 9/2003 | Timmons | ................. | A01B 1/02 172/375 |
| D485,025 S * | 1/2004 | Edwards | ................. | A47L 13/52 D30/162 |
| 8,292,339 B1 | 10/2012 | Auseklis | | |
| 8,356,845 B2 | 1/2013 | Bernard | | |
| 9,103,083 B1 * | 8/2015 | Roland | ................. | E01H 1/1206 |
| 2004/0090073 A1 | 5/2004 | Edwards | | |
| 2004/0189026 A1 * | 9/2004 | Denham | ............... | E01H 1/1206 294/1.3 |
| 2007/0170732 A1 * | 7/2007 | Platt | ..................... | A01K 1/0114 294/1.3 |
| 2007/0267333 A1 * | 11/2007 | Delman | ............... | A01K 1/0114 209/418 |
| 2009/0079211 A1 | 3/2009 | Colaiano | | |
| 2012/0174869 A1 * | 7/2012 | Deppieri | ............... | E01H 1/1206 119/161 |
| 2013/0292957 A1 | 11/2013 | Paculdo | | |
| 2015/0167265 A1 * | 6/2015 | Becattini, Jr. | ......... | E01H 1/1206 294/1.3 |

FOREIGN PATENT DOCUMENTS

| | | | | |
|---|---|---|---|---|
| CA | 2246596 A1 * | 3/2000 | ........... | E01H 1/1206 |
| CA | 2394421 A1 * | 1/2004 | ........... | A01K 23/005 |

* cited by examiner

*Primary Examiner* — Gabriela Puig
(74) *Attorney, Agent, or Firm* — Integrity Patent Group, PLC; Edwin Wold

(57) ABSTRACT

A dog waste collection (and disposal) system designed to fit in a users pocket or small purse for convenient use when walking a pet. A refill of 5-10 disposable bags may also be manufactured separately for each dog scoop. The device is useful for remote collection and efficient sanitary disposal of pet waste.

19 Claims, 5 Drawing Sheets

DOG SCOOP SYSTEMS

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of pet accessories and more specifically relates to a dog waste collection (and disposal) system.

2. Description of Related Art

Many people in modern society have pets. The rapid increase of urban population and increasing popularity of dogs and other pets has created a serious sanitary problem in connection with the disposal of pet waste, and in particular dog waste. Many pet owners have allowed their animals to deposit solid waste on both private and public property, a number of communities have enacted by-laws requiring pet owners, under penalty of fine, to retrieve and dispose of waste created by their pets to keep public health and cleanliness at a respectable level.

While a number of devices have been proposed for the purpose of collecting and disposing of pet waste, they have suffered from various disadvantages. Some devices are not completely disposable and, therefore, require some degree of cleanup. Other types of devices, both of the disposable and reusable varieties, are bulky or inconvenient to carry while walking the animals. This is not desirable.

Some pet owners will simply place a plastic bag, such as a plastic grocery bag, in a clothing pocket for retrieval when needed. The use of a plastic bag may be messy and inconvenient. It is also desirable that dog waste be picked up entirely with no residue left behind. Further, individuals in general do not like to have any touch-contact with the feces being removed. A suitable solution is desired.

Several attempts have been made to solve the above-mentioned problems such as those found in U.S. Pub. Nos. 2004/0090073 to Timothy Edwards; 2009/0079211 to Thomas Eugene Colaiano; 2013/0292957 to Sara Paculdo; U.S. Pat. Nos. D485,025 to Timothy Edwards; U.S. Pat. No. 8,356,845 to John Harbert Bernard; U.S. Pat. No. 8,292,339 to Alexander E. Auseklis, International Patent Nos. CA2394421 to John Roy St.; and CA 2246596 to Bradley J. Clegg. This art is representative of pet accessories. However, none of the above inventions and patents, taken either singly or in combination, is seen to describe the invention as claimed.

Preferably, a dog waste collection (and disposal) system should provide an efficient means for collecting and disposing dog waste in a sanitary manner and, yet would operate reliably and be manufactured at a modest expense. Thus, a need exists for a reliable dog waste collection (and disposal) system to avoid the above-mentioned problems.

BRIEF SUMMARY OF THE INVENTION

In view of the foregoing disadvantages inherent in the known pet accessory art, the present invention provides a novel dog waste collection (and disposal) system. The general purpose of the present invention, which will be described subsequently in greater detail is to provide a dog waste collection (and disposal) system which is sanitary in use.

A dog waste collection system is disclosed herein, in a preferred embodiment, comprising: a dog waste collection assembly having a lid with an attacher (attaching means for attaching the present invention to a dog worn item such as a harness, a belt of a user, a purse, or hung from a wall during non-use periods), a handle having an outer circumference, an inner circumference, an inner volume, and a length, a scraper-scoop, a ramp-attachment, and a roll of disposable bags (to be used with the device). As such, the dog waste collection system comprises the dog waste collection assembly.

The dog waste collection assembly comprises in functional combination the lid, the handle, the scraper-scoop, the ramp-attachment, and the roll of disposable bags. The handle is defined by the outer circumference, the inner circumference, the inner volume, and the length. The lid is structured and arranged to enclose the inner volume with the roll of disposable bags therein during a non-use condition. A split ring is used to provide an attachment means for removably coupling to a dog-worn object such as a harness, as previously mentioned.

Relationally speaking, the scraper scoop is positioned at a distal end of the handle. The distal end is closed such that the disposable bags cannot pass from the inner volume unless retrieved from the open proximal end when the lid is removed. The scraper-scoop comprises a flat scoop; the flat scoop preferably comprises a three-sided sloped perimeter and a front edge (akin to the shape of a dustpan). The lid is positionable at a proximal end of the handle. The proximal end is open; the proximal end is able to be covered via the lid to contain the disposable bags when desired.

The ramp-attachment comprises a biaser (biasing means) able to removably attach one of the roll of disposable bags (a single disposable bag when removed from the roll) to the scraper-scoop for scrape-scooping of dog waste such that the dog waste is able to be positioned within an interior of the disposable bag when an operator reverses the disposable bag in relation to itself such that the disposable bag is turned inside out upon itself. The disposable bag is removable from being coupled to the scraper-scoop for disposal. The ramp-attachment comprises a channel (able to fit over the edge of the disposable bag and the front edge of the scraper-scoop in a frictional fit); the biaser having a flexible body preferably made from either rubber in tension or plastic in tension (the biaser may comprise other materials). The inner volume of the scraper-scoop preferably comprises a 3D cylindrical structure which is suitable to house the roll of disposable bags and the ramp-attachment. The ramp-attachment comprises a rectangular strip in preferred embodiments and may have a wedged profile to better scoop the dog waste from the surface on which the dog waste lies. As designed the dog waste collection system is useful for remote collection and disposal of the dog waste.

A kit is also described including: the dog waste collection assembly having the lid, the handle, the scraper-scoop, the ramp-attachment, the roll of disposable bags, and a set of user instructions.

A method of using a dog waste collection system is also disclosed herein comprising the steps of: removing a disposable bag, attaching the disposable bag to a scraper-scoop using a ramp-attachment, and scooping dog waste. The method may further comprise the steps of: reversing and removing the disposable bag with the dog waste enclosed therein from the scraper-scoop, and disposing of the disposable bag and the dog waste.

The present invention holds significant improvements and serves as a dog waste collection (and disposal) system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, dog waste collection (and disposal) system entitled dog waste collection system (dog scoop), constructed and operative according to the teachings of the present invention.

The various embodiments of the present invention will hereinafter be described in conjunction with the appended drawings, wherein like designations denote like elements.

DETAILED DESCRIPTION

Figure 1:
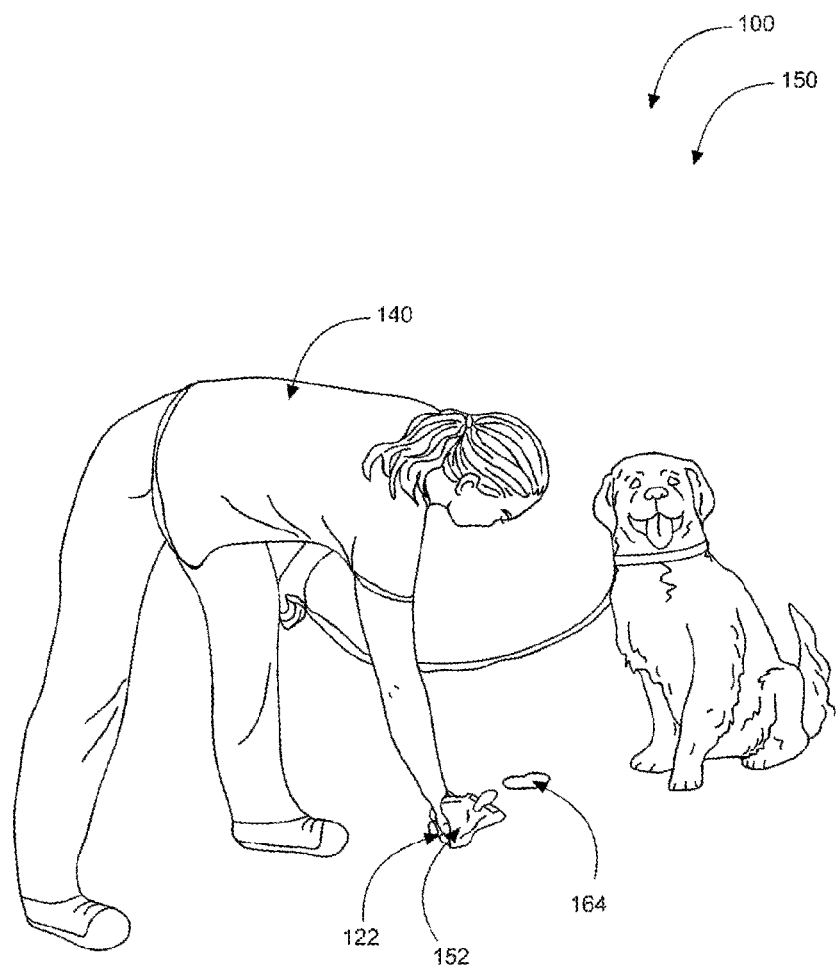
FIG. 1 shows a perspective view illustrating a dog waste collection system during an 'in-use' condition according to an embodiment of the present invention.
Figure 2:
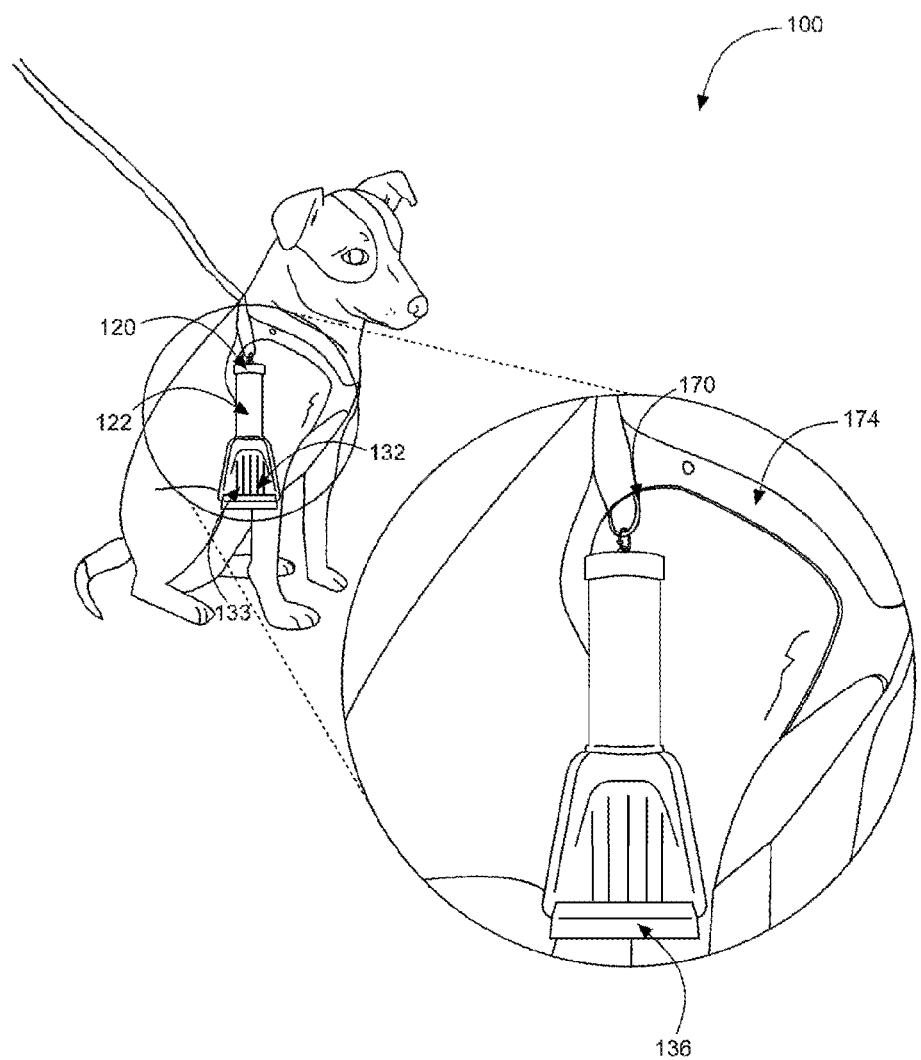
FIG. 2 is a perspective view illustrating a dog waste collection assembly of the dog waste collection system according to an embodiment of the present invention of FIG. 1.
Figure 3:
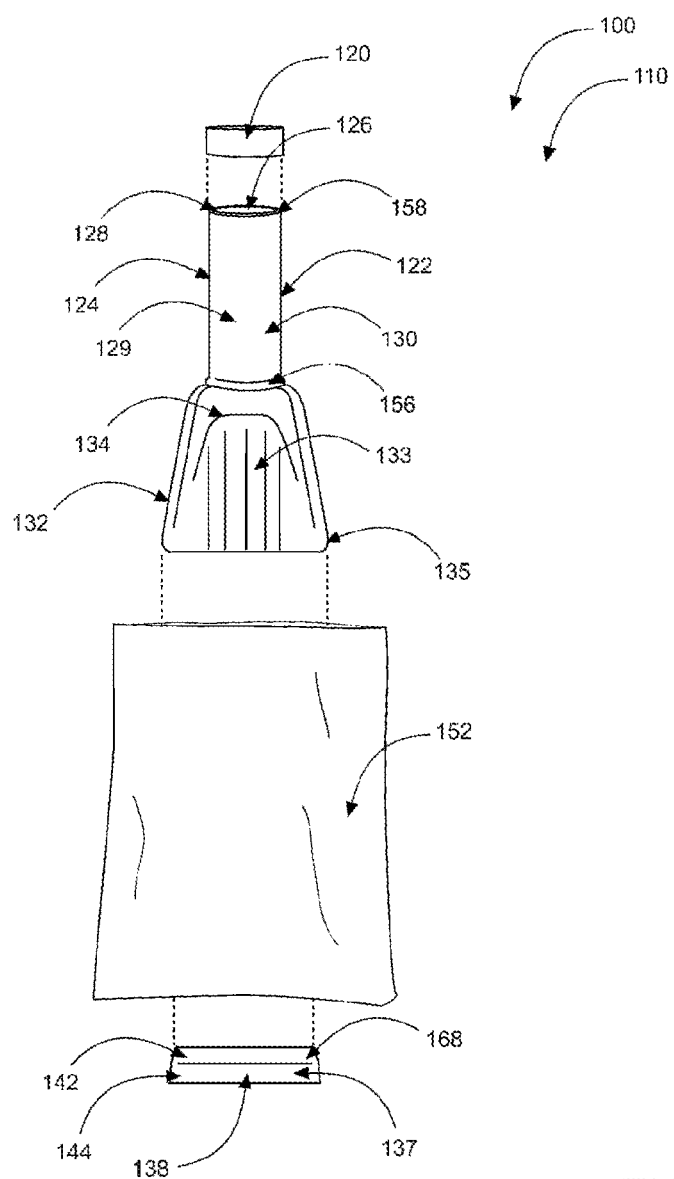
FIG. 3 is an exploded view illustrating of the dog waste collection assembly according to an embodiment of the present invention of FIGS. 1-2.

As discussed above, embodiments of the present invention relate to a pet accessory and more particularly to a dog waste collection (and disposal) system as used to improve the clean up and disposal of pet waste.

Generally speaking, the dog waste collection (and disposal) system is designed to fit in a users pocket or small purse for convenient use when walking a pet. A refill of 5-10 disposable bags may also be manufactured separately for each dog scoop.

Referring now to the drawings by numerals of reference there is shown in FIGS. 1-4 various views of dog waste collection system 100 comprising: dog waste collection assembly 110 comprising lid 120, handle 122 (having outer circumference 124, inner circumference 126, inner volume 128, and length 130), scraper-scoop 132, ramp-attachment 136, and roll of disposable bags 148. Dog waste collection system 100 comprises dog waste collection assembly 110. Dog waste collection assembly 110 comprises in functional combination lid 120, handle 122, scraper-scoop 132, ramp-attachment 136, and roll of disposable bags 148.

Referring now to handle 122; handle 122 is defined by outer circumference 124, inner circumference 126, inner volume 128, and length 130. Lid 120 is structured and arranged to enclose inner volume 128 (via threading means, friction means or the like) with roll of disposable bags 148 being suitably housed therein during a non-use condition. Scraper-scoop 132 is positioned at distal end 156 of handle 122. Lid 120 is positionable at proximal end 158 of handle 122. Lid 120 is removable and engageable as desired.

Ramp-attachment 136 comprises biaser 138 such that a user is able to removably attach one of roll of disposable bags 148 to scraper-scoop 132 for scrape-scooping of dog waste 164. In this way, dog waste 164 is positionable within an interior of disposable bag 152 when an operator (user) reverses disposable bag 152 in relation to itself such that it is turned inside out. Then, disposable bag 152 is removable from being coupled to scraper-scoop 132 for disposal. Dog waste 164 collection system is useful for remote collection and disposal of dog waste 164.

The dog waste collection system further comprises attacher 168, as previously mentioned; attacher 168 comprises split ring 170 in preferred embodiments. Split ring 170, when used, provides a suitable attachment means for removably coupling to a dog-worn object 174. Scraper-scoop 132 comprises flat scoop 134; flat scoop 133 preferably comprises three-sided sloped perimeter 134 and front edge 135. Other profiles may be used for flat scoop 133.

Distal end 156 is closed and proximal end 158 is open when lid 120 is removed. Proximal end 158 is able to be covered via lid 120. Ramp-attachment 136 comprises channel 142 and flexible body 144. Flexible body 144 comprises rubber in tension and/or plastic in tension such that biasing means are enabled.

Referring now again to handle 122; inner volume 128 comprises a hollow 3D cylindrical structure 129 which houses roll of disposable bags 148 and ramp-attachment 136. Ramp-attachment 136 comprises a rectangular strip 137 in preferred embodiments.

Figure 4:
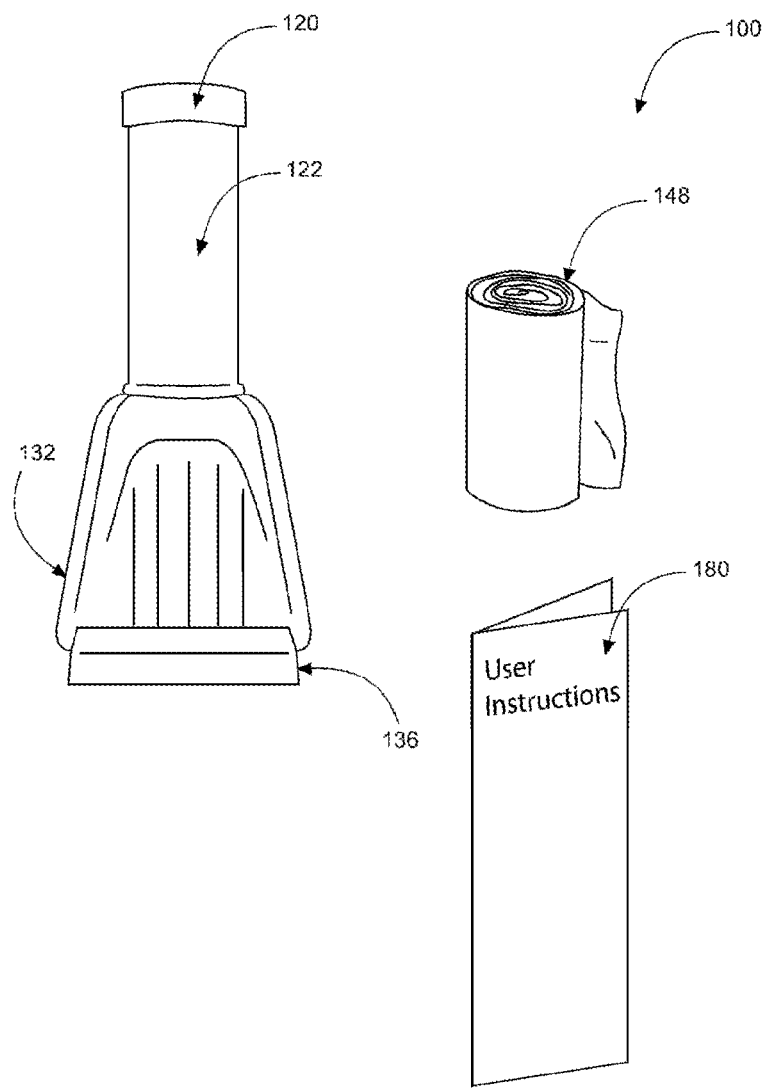
FIG. 4 is a perspective view illustrating a kit of the dog waste collection (and disposal) system according to an embodiment of the present invention of FIGS. 1-3.

Referring to FIG. 4, a kit is also described including: dog waste collection assembly 110 having lid 120, handle 122, scraper-scoop 132, ramp-attachment 136, roll of disposable bags 148, and set of user instructions 180. The kit has instructions such that functional relationships are detailed in relation to the structure of the invention (such that the invention can be used, maintained, or the like in a preferred manner). Dog waste collection system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different scraper/bag combinations, parts may be sold separately, etc., may be sufficient.

Figure 5:
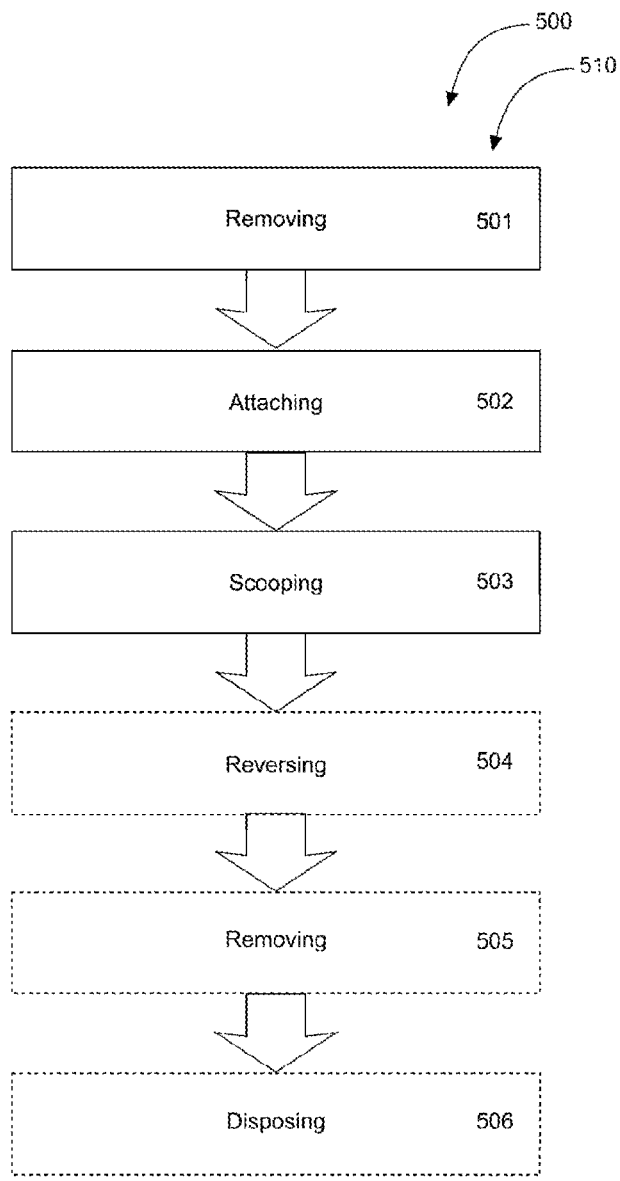
FIG. 5 is a flowchart illustrating a method of use for the dog waste collection (and disposal) system according to an embodiment of the present invention of FIGS. 1-4.

Referring now to FIG. 5 showing flowchart 550 illustrating method of use 500 for dog waste collection system 100 according to an embodiment of the present invention of FIGS. 1-4. As shown, method of use 500 may comprise the steps of: step one 501, removing disposable bag 152, step two 502 attaching disposable bag 152 to scraper-scoop 132 step three 503 using ramp-attachment 136 and scooping dog waste 164. The method 500 may further comprise the steps of: step four 504 reversing and removing disposable bag 152 with dog waste 164 enclosed therein from scraper-scoop 132, and step five 505 disposing of disposable bag 152 and dog waste 164.

It should be noted that step four 504 and step five 505 are optional steps and may not be implemented in all cases. Optional steps of method of use 500 are illustrated using dotted lines in FIG. 8 so as to distinguish them from the other steps of method of use 500.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A dog waste collection system comprising:
   a) a dog waste collection assembly comprising;
      i) a lid;
      ii) a handle having;
         (1) an outer circumference;
         (2) an inner circumference;
         (3) an inner volume; and
         (4) a length;
      iii) a scraper-scoop;
      iv) a ramp-attachment comprising a biaser; and
      v) a roll of disposable bags;
   b) wherein said dog waste collection system comprises said dog waste collection assembly;
   c) wherein said dog waste collection assembly comprises in functional combination said lid, said handle, said scraper-scoop, said ramp-attachment, and said roll of disposable bags;
   d) wherein said handle is defined by said outer circumference, said inner circumference, said inner volume, and said length, and said lid structured and arranged to enclose said inner volume with said roll of disposable bags therein during a non-use condition;
   e) wherein said scraper scoop is positioned at a distal end of said handle;
   f) wherein said lid is positionable at a proximal end of said handle;
   g) wherein said biaser is structured and arranged with said ramp-attachment to removably attach one of said roll of disposable bags to said scraper-scoop for scrape-scooping of a dog waste such that the dog waste is positioned within an interior of said disposable bag when an operator reverses said disposable bag in relation to itself such that it is turned inside out, wherein said disposable bag is structured and arranged with said scraper-scoop such that said disposable bag is removable from being coupled to said scraper-scoop for disposal; and
   h) wherein said dog waste collection system is useful for remote collection and disposal of said dog waste.

2. The dog waste collection system of claim 1 further comprising an attacher.

3. The dog waste collection system of claim 2 wherein said attacher comprises a split ring.

4. The dog waste collection system of claim 3 wherein said split ring provides an attachment means for removably coupling to a dog-worn object.

5. The dog waste collection system of claim 1 wherein said scraper-scoop comprises a flat scoop.

6. The dog waste collection system of claim 5 wherein said flat scoop comprises a three-sided sloped perimeter and a front edge.

7. The dog waste collection system of claim 1 wherein said distal end is closed.

8. The dog waste collection system of claim 1 wherein said proximal end is open.

9. The dog waste collection system of claim 8 wherein open said proximal end is structured and arranged with said lid to be covered with said lid.

10. The dog waste collection system of claim 1 wherein said ramp-attachment comprises a channel.

11. The dog waste collection system of claim 10 wherein said ramp-attachment comprises a flexible body.

12. The dog waste collection system of claim 11 wherein said flexible body comprises rubber in tension.

13. The dog waste collection system of claim 11 wherein said flexible body comprises plastic in tension.

14. The dog waste collection system of claim 1 wherein said inner volume comprises a 3D cylindrical structure.

15. The dog waste collection system of claim 14 wherein said 3D cylindrical structure houses said roll of disposable bags and said ramp-attachment.

16. The dog waste collection system of claim 1 wherein said ramp-attachment comprises a rectangular strip.

17. A dog waste collection system comprising:
   a) a dog waste collection assembly comprising;
      i) a lid with an attacher;
      ii) a handle having;
         (1) an outer circumference;
         (2) an inner circumference;
         (3) an inner volume; and
         (4) a length;
   b) a scraper-scoop;
   c) a ramp-attachment comprising a biaser; and
   d) a roll of disposable bags;
   e) wherein said dog waste collection system comprises said dog waste collection assembly;
   f) wherein said dog waste collection assembly comprises in functional combination said lid, said handle, said scraper-scoop, said ramp-attachment, and said roll of disposable bags;
   g) wherein said handle is defined by said outer circumference, said inner circumference, said inner volume, and said length, and said lid structured and arranged to enclose said inner volume with said roll of disposable bags therein during a non-use condition;
   h) wherein said split ring provides an attachment means for removably coupling to a dog-worn object;

i) wherein said scraper scoop is positioned at a distal end of said handle;
j) wherein said distal end is closed;
k) wherein said scraper-scoop comprises a flat scoop;
l) wherein said flat scoop comprises a three-sided sloped perimeter and a front edge;
m) wherein said lid is positionable at a proximal end of said handle;
n) wherein said proximal end is open except when closed by said lid;
o) wherein said biaser is structured and arranged with said ramp-attachment to removably attach one of said roll of disposable bags to said scraper-scoop for scrape-scooping of a dog waste such that the dog waste is positioned within an interior of said disposable bag when an operator reverses said disposable bag in relation to itself such that it is turned inside out, wherein said disposable bag is structured and arranged with said scraper-scoop such that said disposable bag is removable from being coupled to said scraper-scoop for disposal; and
p) wherein said ramp-attachment comprises a channel;
q) wherein said ramp-attachment comprises a flexible body;
r) wherein said flexible body comprises rubber in tension;
s) wherein said inner volume comprises a 3D cylindrical structure;
t) wherein said 3D cylindrical structure houses said roll of disposable bags and said ramp-attachment, as needed;
u) wherein said ramp-attachment comprises a rectangular strip; and
v) wherein said dog waste collection system, as designed, is useful for remote collection and disposal of said dog waste.

18. The dog waste collection system of claim 17 further comprising a kit including:
a) said dog waste collection assembly having;
   i) said lid;
   ii) said handle;
   iii) said scraper-scoop;
   iv) said ramp-attachment;
   v) said roll of disposable bags; and
b) a set of user instructions.

19. A method of using the dog waste collection system of claim 17 comprising the steps of:
a) removing a disposable bag;
b) attaching said disposable bag to a scraper-scoop using a ramp-attachment;
c) scooping dog waste;
d) reversing and removing said disposable bag with said dog waste enclosed therein from said scraper-scoop; and
f) disposing of said disposable bag and said dog waste.

* * * * *